No. 756,629. PATENTED APR. 5, 1904.
W. HARRISON.
DEVICE FOR ERECTING BUILDINGS OUT OF PLASTIC MATERIAL.
APPLICATION FILED MAY 25, 1903.
NO MODEL. 7 SHEETS—SHEET 3.

Witnesses
Edward R. Monroe.
Mary S. Tooker

Inventor
William Harrison
By Edward Taggart
Attorney

No. 756,629. PATENTED APR. 5, 1904.
W. HARRISON.
DEVICE FOR ERECTING BUILDINGS OUT OF PLASTIC MATERIAL.
APPLICATION FILED MAY 25, 1903.
NO MODEL. 7 SHEETS—SHEET 6.

Witnesses
Edward R. Momoe
Mary S. Tooker

Inventor
William Harrison
By Edward Taggart
His Attorney

No. 756,629. PATENTED APR. 5, 1904.
W. HARRISON.
DEVICE FOR ERECTING BUILDINGS OUT OF PLASTIC MATERIAL.
APPLICATION FILED MAY 25, 1903.
NO MODEL. 7 SHEETS—SHEET 7.

No. 756,629. Patented April 5, 1904.

UNITED STATES PATENT OFFICE.

WILLIAM HARRISON, OF GRAND RAPIDS, MICHIGAN.

DEVICE FOR ERECTING BUILDINGS OUT OF PLASTIC MATERIAL.

SPECIFICATION forming part of Letters Patent No. 756,629, dated April 5, 1904.

Application filed May 25, 1903. Serial No. 158,732. (No model.)

*To all whom it may concern:*

Be it known that I, WILLIAM HARRISON, a citizen of the United States, residing at Grand Rapids, in the county of Kent and State of Michigan, have invented new and useful Improvements in Devices for Erecting Buildings Out of Plastic Material, of which the following is a specification.

This device relates to a new and useful method of erecting buildings constructed of cement, grout, or other plastic material; and the invention consists of an upright frame so constructed that it may be readily taken down and put up, in combination with the mold or molds for receiving the plastic material in its plastic state and for retaining the same until it is hardened so as to form the walls of the building.

It also consists in combining with an upright removable frame an outer-wall mold and suitable means for raising the said mold as the work progresses upwardly, whereby the walls of the building are completed without removing the upright frame, but said frame being so constructed that when the cement walls of the building are completed it may be removed.

It also consists in using, in combination with the upright frame, mold-plates for molding or forming the plastic material for the inside walls and partitions.

It also consists in the means for raising the removable mold which fashions the outside plastic wall.

It further consists in the combination and arrangement of parts hereinafter pointed out and claimed.

The objects of my invention are, first, to form a practical and cheap method of constructing cement buildings; second, to furnish a pattern or frame for constructing a plurality of complete buildings from the same pattern, which pattern consists of a movable frame and movable molds; third, to connect the several parts of the frame together in such a manner that the entire frame can be readily taken down and moved and again erected for the purpose of constructing another building; fourth, other objects hereinafter described and claimed. These objects I accomplish by means of the mechanism illustrated in the accompanying drawings, in which—

Fig. 6 is an end view of the corner-post $b$. Figs. 8 and 9 are respectively side elevations of the post $b$. Fig. 13 is a cross-sectional view on the line $x x$ of Fig. 14. Figs. 14 and 15 are detail views of the tie-girth $v$ and the angle-iron $u$.

Similar characters refer to similar parts throughout the several views.

Figure 1:
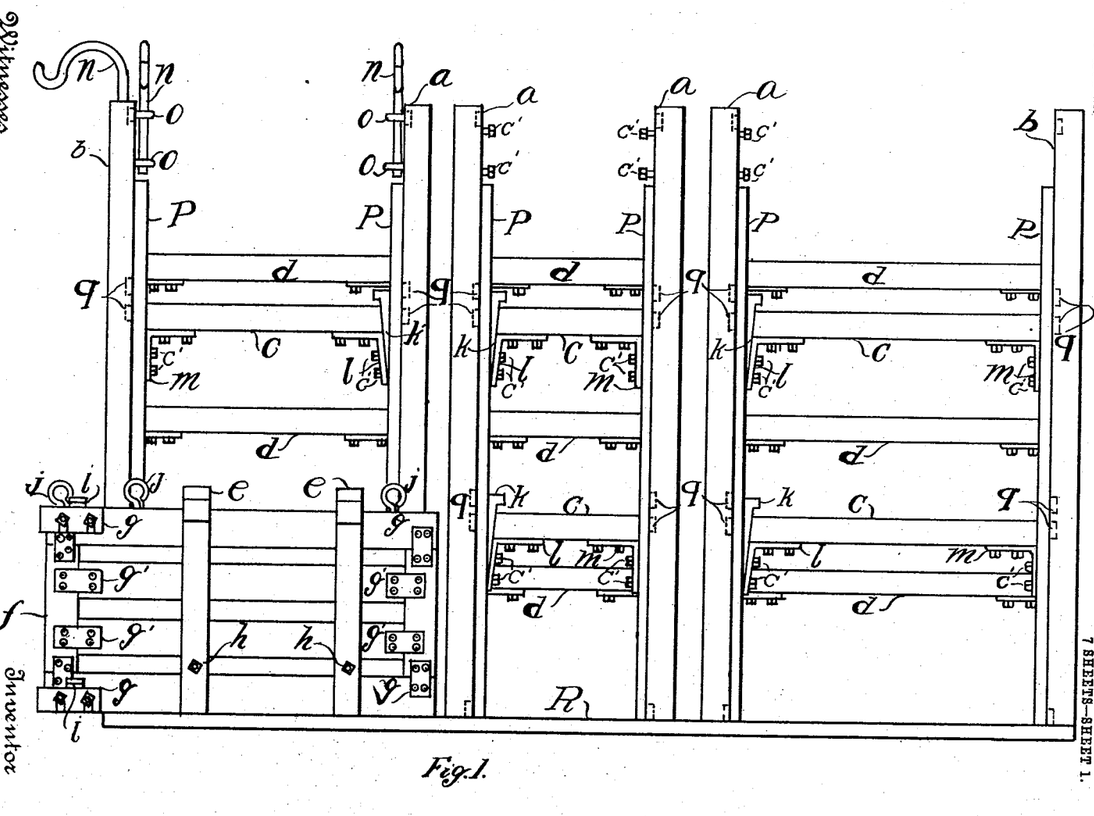
Figure 1 shows a side elevation of a building-frame constructed in accordance with my invention, showing the arrangement of the upright timbers of the frame and also a side elevation of a portion of the mold used in constructing the outside or outer wall of the building, also showing my preferred form of cross-bracing the upright timbers.
Figure 2:
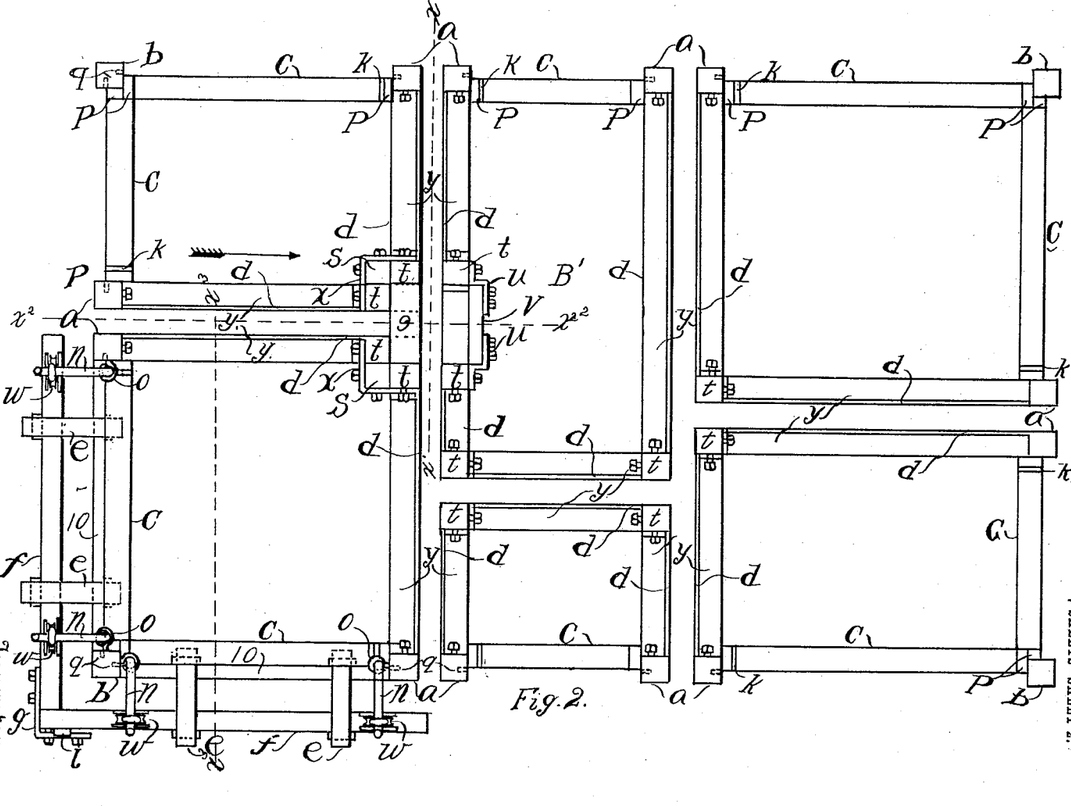
Fig. 2 shows a plan view illustrating the position of the framework which provides for the making of the inside partitions in the building and also shows a corner-section of the outside mold and the supports for making the mold for the chimney.

$a\ a$, &c., are the intermediate posts or upright timbers, which, with the corner-posts, form supports for the outside and inside girths or braces and also form supports for the removable plates 10, as shown in Figs. 1 and 2.

$b\ b$ are the corner-posts of the structure.

Figures 16, 17, 18, 19:
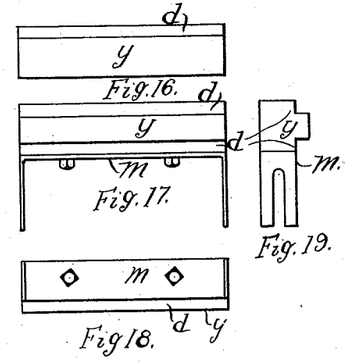
Fig. 16 is a plan view of the girth or brace $y$.
Fig. 17 is a side elevation of the brace $y$.
Fig. 18 is an inverted plan view of the brace $y$.
Fig. 19 is an end view of the brace $y$. (See also Fig. 38.)

$c\ c$, &c., are outside girths, which are detachably connected to the outside posts. When in position, the girths $c\ c$ retain the posts $a$ and $b$ firmly in place, making a rigid structure. Each girth has attached to either end of it the angle-irons shown by $l$ and $m$. Each angle-iron is provided with a slot, as shown in Fig. 19, and these slots are adapted to fit over the stationary bolts $c'\ c'$ and are locked in position by means of the slotted wedges K. The girths $c\ c$ are adjustable and are moved upwardly from one set of bolts $c'\ c'$ to another as the work of building the cement wall progresses upwardly.

$y\ y$, &c., are the inside girths, (see Fig. 2,) which serve the purpose of supporting the frame and also serve as supports for the mold-plates used in constructing the partition-walls, as hereinafter described.

$d\ d$ are grooves cut into the girths $y$ for the reception of the mold-plates $z$. (See Figs. 3 and 4.) The girths $y$ are adjustable, and each is provided at its ends with the same means for holding and adjusting as are the girths $c\ c$.

P P are strips of timber or other material, secured to the post $b$ and are set or placed far enough to one side of the posts to allow the inside mold 10 to come flush with the outside of the posts $a$ and $b$. (See Figs. 1 and 2, also detail views, Figs. 8 to 12.) By this construction the inside of the cement wall is practically in a plane with the outer surface of the posts.

$t\ t$ are the inside posts arranged in position to support the mold-plates for the construction of the inside partitions and also for the construction of a chimney. These posts $t$ are held in place by the girths $y$ and in turn support the girths, said girths being tightened upon these posts, as above described.

$q\ q$ are mortises in the upright posts $a$ and $b$, (see Fig. 2,) designed to receive the ends of the irons 12, said irons 12 being extensions of the mold-plate 10 of the mold which makes the outside cement wall, said plate 10 having a vertical adjustment and is raised as the cement wall goes upward. The section of the outer mold is shown in Figs. 1 and 2. The outside mold has also an outer wall and an inner wall, both being provided with means for raising the same.

Figure 27:
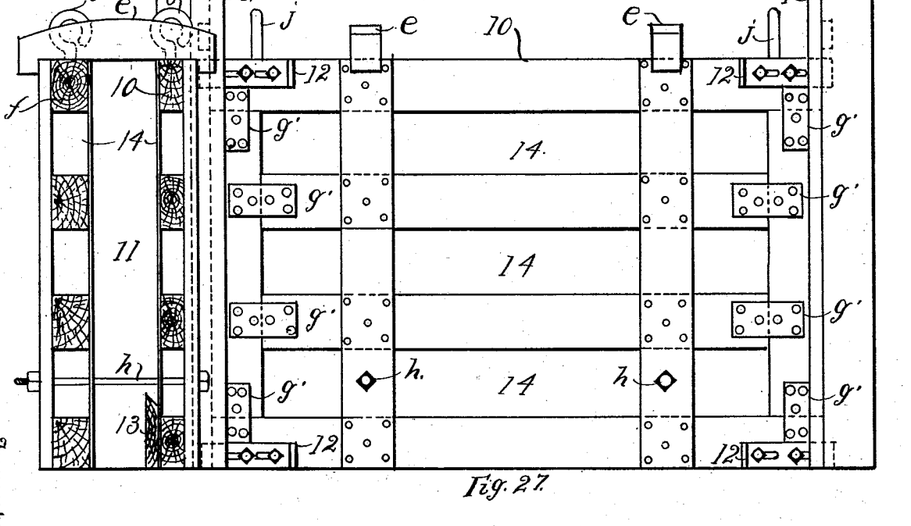
Fig. 27 is a cross-sectional view on the line $x^3\ x^3$ of Fig. 2, showing my preferred form of constructing the inside of the outer mold and also its relation to the supporting-frame.
Figures 28, 29, 30, 31, 32, 33:
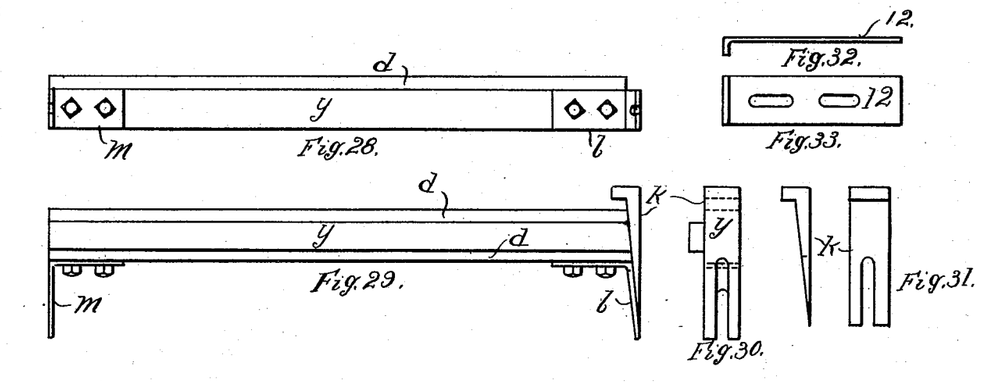
Fig. 28 is a plan view of the long tie-girths $y$. (See Fig. 2.)
Fig. 29 is a side elevation of said tie-girth.
Fig. 30 is an end view of the tie-girth.
Fig. 31 is a detail view of the wedge K used in tightening the inside girths.
Figs. 32 and 33 are detail views of the sliding irons 12 used on the inside molds.
Figure 34:
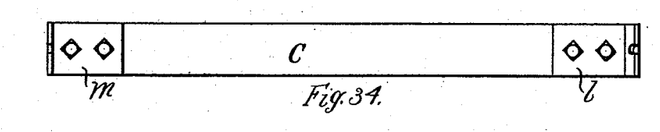
Figs. 34, 35, and 36 are detail views of the outside tie-girths $c$.
Figures 35, 36:
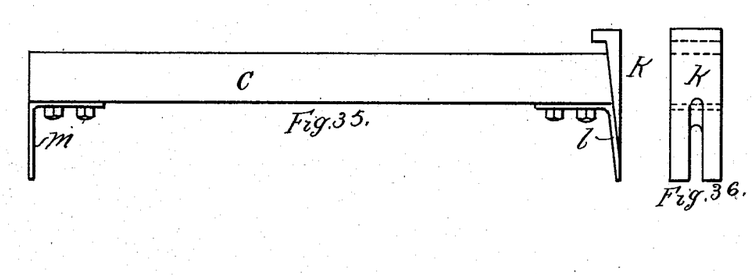
Figure 37:
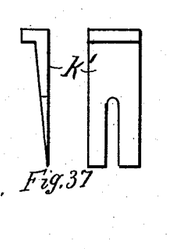
Fig. 37 is a detail view of the wedge K' for tightening the girth $c$, the form of the wedges being the same as those used in tightening the inside girths.
Figure 38:
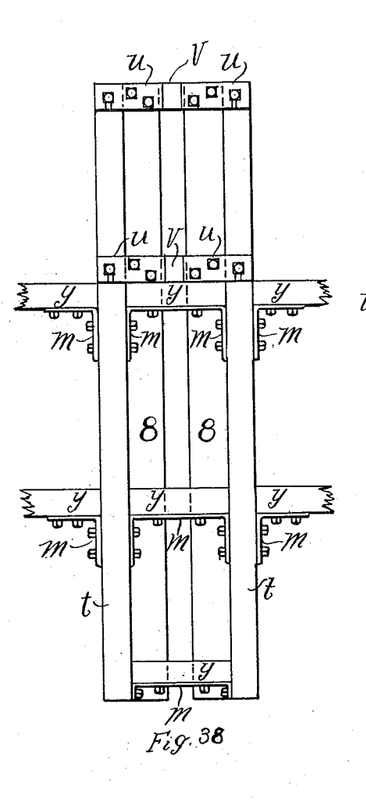
Fig. 38 is a side view of the chimney-mold.

$f$ is the outside plate of the outer mold itself, constructed of scantling or other suitable material, and is held together by the plates $g'$. The inside of the mold is covered by a mold plate or sheet 14, which covers its entire surface, as shown in Fig. 27. The inside plate 10 of the mold is constructed in the same manner as the outside plate and is preferably provided with a smooth plate. The outside and inside walls of the mold are held in place when filled with cement or plastic material by means of the clamps $e$.

Figure 20:
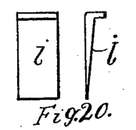
Fig. 20 is a detail view of the wedge used in fastening the posts and girths together, as hereinafter described.
Figure 21:
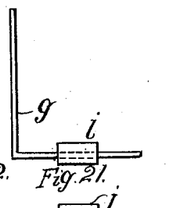
Figs. 21, 22, and 23 are detail views of the angle-iron $g$ used in combining the corner of the outer mold.
Figure 22:
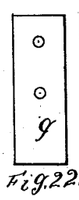
Figure 23:
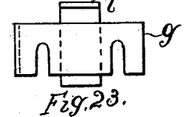
Figure 24:
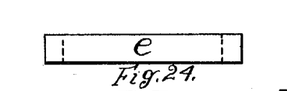
Figs. 24, 25, and 26 are detail views of the clamp $e$ used in connection with the outer mold for retaining the upper part of the said mold in place when filled with plastic material.
Figure 25:
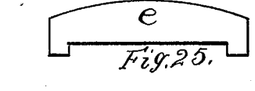
Figure 26:
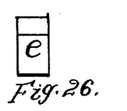

$g\ g$ are angle-irons which hold the angles of the outside walls of the outer mold in place and are tightened by means of wedges $i$, as fully shown in Fig. 20. These angle-irons are shown in detail in Figs. 21, 22, and 23 with the wedges $i$ in position.

$h\ h$ are bolts which pass entirely through the walls of the outside mold, as shown in Fig. 27, for retaining the lower part of the mold in position to prevent the same from spreading while being filled with the plastic material, but which are removed before the outer mold is raised to finish the next course of cement.

$i\ i$ are wedges driven back of the angle-irons $g$ to hold them rigidly in position. These wedges are drawn out so as to loosen the same before the mold is raised.

$j\ j$ are eyebolts secured to the top of the outside and inner walls of the outside mold and are used for raising the mold, as hereinafter described.

$n\ n$ are hooked rods secured adjustably to the upright outer posts of the frame and are adapted to receive a rope or chain which engages with the eyebolts and passes over the hooked part of $n$ for raising and sustaining the outer mold. This or a similar arrangement is deemed of importance for lifting and sustaining the outer wall of the mold. The inner wall of the mold may be supported by any suitable means. If desirable, pulleys may be used in connection with the hooks $n$ and the eyebolts.

R is a sill of the frame which may be supported on any suitable foundation.

In building the outer cement wall the outer mold extends entirely around the frame and rests upon the foundation prepared to receive and support the building when completed. The mold is first filled with grout or any suitable plastic material which hardens sufficiently to sustain itself and the next course above it. When the lower course is sufficiently hardened, the mold is raised so that the bottom is substantially flush with the top of the finished course. The mold is then tightened up and again filled with a new supply of plastic material, and the work progresses upwardly until the wall is completed. The girths $c$ are also moved up at the same time and tightened in the manner above described.

The cement partitions are constructed by the use of mold-plates supported by the upright timbers of the frame, and such cement partitions are carried upward by steps, preferably at the same time and in the same manner as are the outer cement walls, the inner posts $t\ t$ supporting the girths and the girths supporting the mold-plates.

$y\ y$ are the inside girths, which are detachably connected to the upright posts and are held a sufficient distance apart for sustaining the mold-plates in position to form the inside cement partition. Each girth $y$ is provided with a groove $d$, which receives the lower edge of one of the movable plates $z$.

Figure 3:
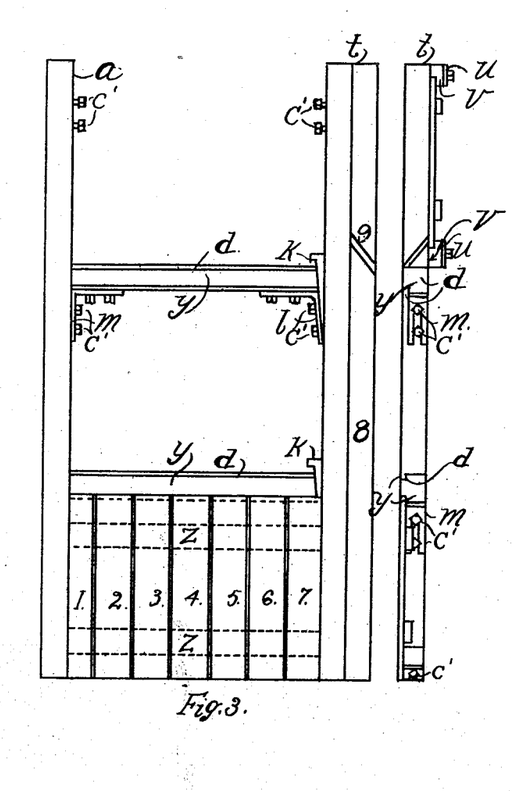
Fig. 3 is a cross-section of the building-frame on line $x^2 x^2$ of Fig. 2, showing a section of one of the plates for molding the partition between the rooms in the building and also showing two cross-braces.
Figure 4:
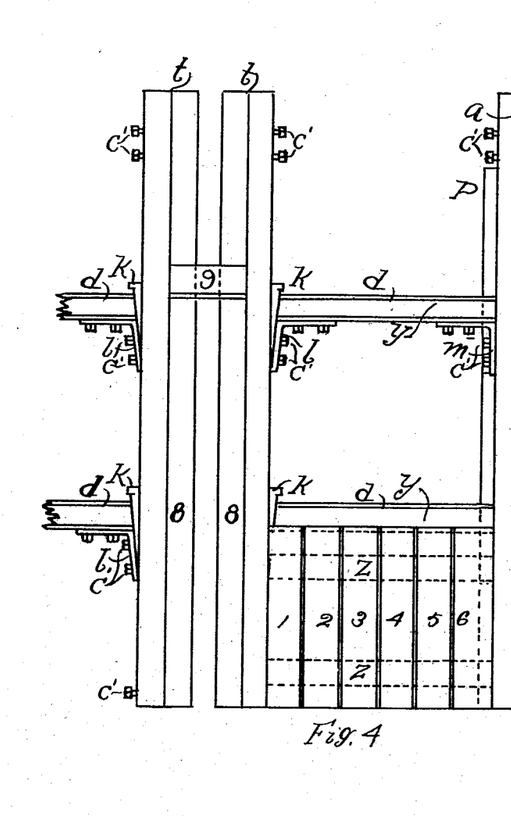
Fig. 4 is a horizontal cross-section on line $x' x'$ of Fig. 2, with an elevation of one of the mold-plate sections, the mold-plate sections for the internal partitions being all substantially alike in construction.

$z\ z$ show the mold-plates. Each mold-plate is made of sufficient length to form the partition. The preferred form of these mold-plates is illustrated in Figs. 3 and 4 of the drawings. They are preferably made of timbers, (shown by 1, 2, 3, 4, 5, 6, and 7,) and the surface of the cement wall is therefore left rough in order to furnish means for plastering. If it is desirable, however, to have the walls smooth, lining-plates may be used.

In building the inside partitions I first fill the lower course with plastic material, and when the same is hardened I then raise the girths $y$ a sufficient distance for the next course and then place the mold-plates $z$ in the grooves $d$, making a new mold for the next course, and I thus continue the operation until the building is completed, the girths $y$ being held in position by the same means as the girths $d$ and preferably raised at the same time, so that the outer walls and the inner walls progress upwardly with equal steps.

In order to form openings for the doors and the windows, suitable frames may be placed in the molds as the cement walls are being raised.

Figures 5, 7:
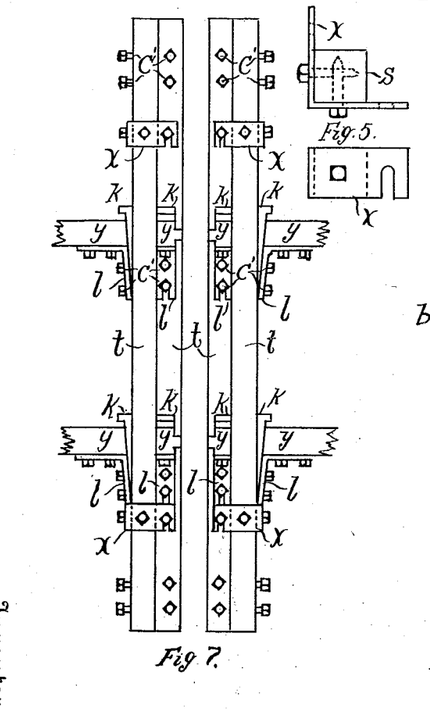
Fig. 5 is an enlarged view of the angle-iron $x$ and the holding-block $s$ (see Fig. 2) used in connection with the chimney construction.
Fig. 7 is an outside view of the mold for making the chimney looking in the direction of the arrow in Fig. 2.
Figures 6, 8, 9:
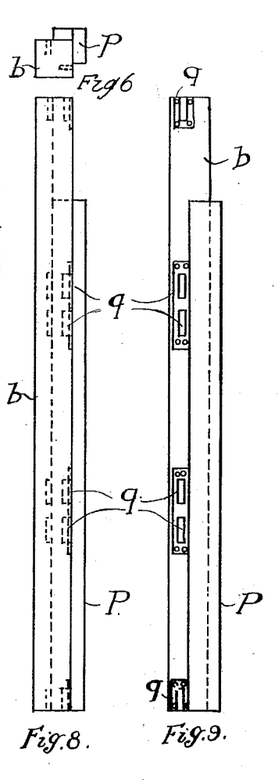
Figure 10:
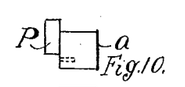
Fig. 10 is an end elevation of the post $a$.
Figure 11:
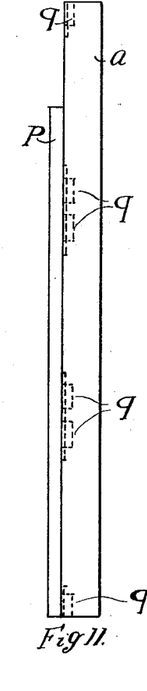
Figs. 11 and 12 are respectively side elevations of the intermediate post $a$.
Figure 12:
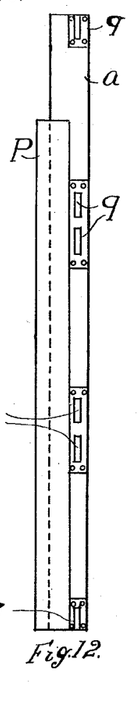

In addition to the outer and the inner cement walls a cement chimney or chimneys may be built by the same operation. In the drawings I have shown means for constructing one of said chimneys. (See Fig. 2.) For the purpose of holding the chimney-posts $t\ t$ together I use the blocks S, (for detail view see Fig. 5,) which blocks S are held in place by means of the angle-irons.

Figures 13, 14:
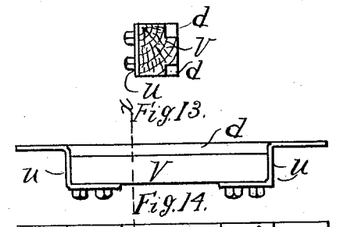
Figure 15:
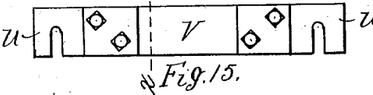

$u\ u$ are double angle-irons bolted to the short tie-girth $v$, which may be used in coursing around the chimney in order to give the chimney-wall greater thickness. (For a detail view see Figs. 13, 14, and 15.)

In constructing a chimney which is not built from the basement up I provide the supports 8 8, placed in a space below where the chimney begins, and I also place upon the upper ends of the posts 8 8 a shelf 9, thus making a support for the lower end of the cement chimney. The chimney, however, may be built up from the foundation by means of the mold-plates, in which case it progresses upwardly in the same manner and at the same time as the inside and outside walls of the building.

I have described above my preferred form of constructing the knockdown frame and of constructing the molds for making the cement walls. I do not wish, however, to confine my invention to the specific means for constructing the walls and braces, as it will be evident that modifications may be made without departing from the spirit of the invention, the invention consisting in the use of a knockdown frame with suitable molds for constructing a cement or grout house, said frame being so attached together that it may readily be removed from the completed cement structure and be used over and over again in building houses of the same kind.

In using my invention a large number of houses may be built of the same pattern, so far as the cement walls are concerned, with one frame and one set of molds. If houses of different kinds are to be constructed, it would require a frame for each house having different chimneys or different arrangement of rooms.

Having thus described my invention, what I claim to have invented, and desire to secure by Letters Patent, is—

1. In combination with an upright frame a plurality of outside posts, a plurality of inside posts, braces detachably connected to the said posts, chimney-posts connected together, mold-plates for constructing the outside walls, mold-plates for constructing the inside walls, and suitable mold-plates for constructing the cement chimney, all substantially as described.

2. In combination with a series of removable upright posts in position to determine the form of the inner surface of the outer cement wall to be around such upright posts, detachable and vertically-adjustable girths connected to said posts, a mold outside of the said upright posts and in contact therewith, and suitable means for moving the said molds upwardly as the wall rises, said posts and girths adapted to be removed from the completed cement structure.

3. A frame or structure for erecting cement buildings consisting of a plurality of removable upright posts set to determine the form of the outer walls of the cement building, a plurality of removable posts placed within the outer line of posts to determine the position and number of the cement partitions of the completed structure, inner and outer detachable and vertically-adjustable girths connected with said posts in combination with suitable means for forming the outer cement walls and the inner cement partitions.

4. A means for building a house of plastic material consisting of a removable frame composed of upright posts placed in position to determine the size and shape of the house to be built, detachable and vertically-adjustable girths connected with said posts, means supported and guided by the said frame for making the cement wall of the building, said frame removable from the said building when the walls are completed.

5. A means for building a house of plastic material, consisting of a removable frame composed of upright posts placed in position to determine the size and shape of the house to be built, removable partitions for said frame formed of upright posts, inner and outer detachable and vertically-adjustable girths connected with said posts, means supported and guided by said frame for making the cement walls of the building, said frame and partitions removable from the said building when its walls and their partitions are completed.

In testimony whereof I have hereunto set my hand in presence of two subscribing witnesses.

WILLIAM HARRISON.

Witnesses:
  MARY S. TOOKER,
  CLARA HAMILTON.